US006915268B2

(12) United States Patent
Riggs et al.

(10) Patent No.: US 6,915,268 B2
(45) Date of Patent: Jul. 5, 2005

(54) TRANSPORT LOGISTICS SYSTEMS AND METHODS

(75) Inventors: Glenn E. Riggs, New Milford, CT (US); John H. Kivela, New Milford, CT (US); Robert H. Shellman, Southbury, CT (US); Joseph F. Rocky, Jr., Brookfield Center, CT (US); Stanley M. Bainor, Midland, MI (US); Ralph K. Brechter, New Fairfield, CT (US); Douglas L. Clark, New Milford, CT (US); James R. Clark, Midland, MI (US); Jon L. Clow, New Milford, CT (US); Amy Daley, Norfolk, CT (US); Larry Hu, Redding, CT (US); Louis F. Indelicato, Brookfield, CT (US); William J. Lohan, Brookfield, CT (US); Michael M. Naughton, Marbledale, CT (US); Peter P. Nelson, Brookfield Center, CT (US); Alan D. Shollenberger, Danbury, CT (US); M. Nadine Willett, Bradenton, FL (US); Doug Johnston, Newtown, CT (US); Donald H. Mueller, Sandy Hook, CT (US); Michael D. Michaud, Midland, MI (US); Robert Phaneuf, Sandy Hook, CT (US); Joseph J. Bainor, Midland, MI (US)

(73) Assignee: Odyssey Logistics & Technology Corporation, Danbury, CT (US)

( * ) Notice: Subject to any disclaimer, the term of this patent is extended or adjusted under 35 U.S.C. 154(b) by 288 days.

(21) Appl. No.: 09/915,301
(22) Filed: Jul. 27, 2001

(65) Prior Publication Data

US 2002/0065738 A1 May 30, 2002

Related U.S. Application Data

(60) Provisional application No. 60/221,541, filed on Jul. 28, 2000.

(51) Int. Cl.⁷ ............................................. G06F 17/60
(52) U.S. Cl. ...................................................... 705/7
(58) Field of Search ........................................ 705/7, 8

(56) References Cited

U.S. PATENT DOCUMENTS 4,346,442 A    8/1982  Musmanno ................. 364/408

(Continued)

FOREIGN PATENT DOCUMENTS

CA             2337656 A1 *  8/2001  ........... G06F/17/60

(Continued)

OTHER PUBLICATIONS

U.S. Appl. No. 60/154,773.*

(Continued)

Primary Examiner—Susanna M. Diaz
(74) Attorney, Agent, or Firm—Brown Raysman Millstein Felder & Steiner LLP

(57) ABSTRACT

A logistics system manages the shipments of goods supplied from a plurality of different shippers by a plurality of carriers. It has a variety of modules integrated with each other to perform various functionalities. For example, it may have a purchasing module evaluating proposals by shippers for respective shipments of goods and awarding contracts for the shipments to the plurality of carriers. It may have an optimization module analyzing the proposals and informing the purchasing module if an opportunity exists for at least some of the shipments to be consolidated, in which case at least one contract awarded by the purchasing module is for a consolidated group of the shipments. It may have a contract administration module maintaining information relating to the status of proposals received and contracts awarded by the purchasing module. It may have a scheduling module scheduling shipments according to the awarded contracts. It may also have a shipment management module tracking the status of shipments awarded by the purchasing module and scheduled by said scheduling module. It may further have a financial module authorizing payments according to the status of shipments tracked by the shipment management module are passed between first and second asynchronous clock domains.

43 Claims, 13 Drawing Sheets

U.S. PATENT DOCUMENTS

| | | | | |
|---|---|---|---|---|
| 4,528,643 | A | | 7/1985 | Freeny, Jr. .................. 364/900 |
| 4,827,508 | A | | 5/1989 | Shear ........................... 380/4 |
| 4,829,426 | A | | 5/1989 | Burt ............................ 364/300 |
| 5,025,372 | A | | 6/1991 | Burton et al. ............... 364/406 |
| 5,032,989 | A | | 7/1991 | Tornetta ..................... 364/401 |
| 5,193,056 | A | | 3/1993 | Boes ........................... 364/408 |
| 5,450,317 | A | | 9/1995 | Lu et al. ...................... 364/402 |
| 5,485,369 | A | * | 1/1996 | Nicholls et al. ............... 705/9 |
| 5,506,779 | A | | 4/1996 | Kanki .......................... 364/449 |
| 5,574,640 | A | | 11/1996 | Sycara et al. ............... 364/401 |
| 5,631,827 | A | | 5/1997 | Nicholls et al. ............ 395/464 |
| 5,715,314 | A | | 2/1998 | Payne et al. .................. 380/24 |
| 5,758,329 | A | * | 5/1998 | Wojcik et al. ................ 705/28 |
| 5,774,870 | A | | 6/1998 | Storey .......................... 705/14 |
| 5,794,207 | A | | 8/1998 | Walker et al. ................ 705/23 |
| 5,794,210 | A | | 8/1998 | Goldhaber et al. ........... 705/14 |
| 5,864,830 | A | | 1/1999 | Armetta et al. .............. 705/41 |
| 5,878,141 | A | | 3/1999 | Daly et al. ..................... 380/25 |
| 5,897,620 | A | | 4/1999 | Walker et al. ................. 705/5 |
| 5,899,980 | A | | 5/1999 | Wilf et al. ..................... 705/26 |
| 5,910,896 | A | | 6/1999 | Hahn-Carlson ........ 364/479.01 |
| 5,960,411 | A | | 9/1999 | Hartman et al. .............. 705/26 |
| 6,064,981 | A | | 5/2000 | Barni et al. ................... 705/26 |
| 6,219,653 | B1 | | 4/2001 | O'Neill et al. .............. 705/400 |
| 2001/0047284 | A1 | * | 11/2001 | Blalock et al. ................ 705/8 |
| 2002/0019761 | A1 | | 2/2002 | Lidow .......................... 705/10 |
| 2002/0049622 | A1 | | 4/2002 | Lettich et al. ................. 705/7 |
| 2003/0216993 | A1 | * | 11/2003 | Goldwerger et al. .......... 705/37 |

FOREIGN PATENT DOCUMENTS

| | | | | |
|---|---|---|---|---|
| JP | | 10097576 | 9/1996 | ........... G06F/19/00 |
| JP | | 11003101 | 6/1997 | ........... G06F/17/00 |
| JP | | 1112023 | 10/1997 | ........... G06F/17/60 |
| JP | | 1118491 | 12/1997 | ........... G06F/17/60 |
| WO | | WO0152158 | 7/2001 | |
| WO | | WO 01/59652 A2 | * 8/2001 | ........... G06F/17/60 |

OTHER PUBLICATIONS

U.S. Appl. No. 60/178,919.*

U.S. Appl. No. 60/200,035*

Rojek, Karen. "How Baxter Improved Data Exports." AS/400 Systems Management, vol. 26, No. 5, pp. 52–53, May 1998.*

"Internet Services: Here's a List." Journal of Commerce, SPEC section, Five Star Edition, p. 12.*

Challener, Cynthia. "Environmental Software Incorporates Internet Capabilities." Chemical Market Reports, p. 17, Mar. 27, 2000.*

Hickey, Kathleen. "A Perfect Match." Traffic World, vol. 263, No. 2, p. 37, Jul. 10, 2000.*

"Webmodal Names Sam F. Niness III Vice President of Business Development." Business Wire, p. 0456, Jul. 5, 2000.*

Aragon, Lawrence. "Union Pacific Railroad Goes Full Steam Ahead." PC Week, vol. 14, No. 49, p. 58(2), Nov. 24, 1997.*

"Atrion International Acquires CHEMTOX® System and Database." PR Newswire, p. 7973, Oct. 8, 1998.*

Edward Marien. "Structuring the Shipper/Carrier Relationship". Transportation & Distribution. Jul. 1995. vol. 36. Iss. 7. Downloaded from Dialog.*

William Augello. "Take it to the Limit". Distribution. Jun. 1994. vol. 96. Iss. 7. Downloaded from Dialog.*

Richardson, Helen. "Bad Bids are no Bargain". Transportation & Distribution. Feb. 1994. vol. 35. Iss. 2. Downloaded from Dialog.*

* cited by examiner

TRANSPORT LOGISTICS SYSTEMS AND METHODS

This application claims the benefit of the filing date of provisional application No. 60/221,541, filed on Jul. 28, 2000 and entitled "Transport Logistics Systems and Methods", the disclosure of which is hereby incorporated by reference in its entirety.

BACKGROUND

1. Field of the Invention

This invention relates generally to logistics systems and methods. In particular, the present invention relates to logistics systems and methods for the transportation of goods.

2. Description of the Related Art

There are inefficiencies in the shipments of goods and a lack of good strategic planning. In a typical situation, a large shipper and its customers may all have sophisticated Enterprise Resource Planning (ERP) system software. The shipper's ERP system fine tunes production assets to manage customer orders, production overflows, etc., so that they are continuously producing and providing products to their customers. When a customer wants to order a product, its system issues a purchase order document that must be forwarded to the shipper and input into its ERP system. The shipper's ERP system prepares the purchase order as a customer order, obtains and allocates the necessary inventory, schedules the order, arranges for manufacturing units to manufacture the ordered product and then gets the product ready for shipment. After this is done, the shipper calls a carrier to pick up the shipment and an invoice is sent to the customer after the shipment has been picked up by the carrier.

From the perspective of the ordering customer's system, the purchase order remains open and unpaid until the ordered product(s) is physically received from a carrier and is entered into the ordering customer's system. After the carrier accepts a shipment (i.e., gives a receipt) and before the shipment arrives at the shipper's customer and is entered into their ERP system, it cannot be tracked by the ERP system software of either the shipper or the shipper's customer. If a shipment is not received when expected, the customer and shipper must do a manual trace through phone calls or the like to determine the status of the shipment.

The carrier is an owner of transport assets and services. For instance, the railroad carriers have trains, track, etc., and motor carriers have trucks and drivers. The carriers carry out a great deal of logistics since their profits depend greatly on how well they optimize the utilization of their transport assets and services. A primary goal of the carriers is to load their ships, trucks, etc., as full as possible. They typically use their own internal business and logistics applications, frequently Logistics Management Systems (LMS) which are independent of the shipper and the shipper's customer, to decide how to best accomplish their shipments.

Unfortunately, the applications systems of the shipper and the carrier do not communicate with each other. Thus, circumstances may arise where the shipment can be accomplished more efficiently and less expensively by, for example, shipping one day earlier or later or consolidated with the shipment of another shipper, but the shipper nevertheless requests the shipment when it does because it is not aware that such circumstances exist and does not cooperate with other shippers.

Furthermore, the carriers are fragmented into various modes of transport (truck, rail, marine, air). These modes make the supplier's logistics of shipping products more difficult because there is no integration between modes. It also results in a large amount of administrative and financial transactions related to the shipments. The traditional transactions were generically illustrated in FIG. 23 of the provisional application and illustrated with specific reference to the truck mode in FIG. 32 of the provisional application. Even third-party logistics service providers typically only accommodate one or two modes. For example, there are chemical tanker brokers (handling chemical tankers, product tankers, oil tankers), third party trucking companies (handling package trucks and some bulk trucks), freight forwarders (handling containers and some trucks/warehouses) and terminals service providers (handling terminals, warehouses, and some transport capability).

These problems are especially acute when dealing with ocean transport and with some products, such as chemicals, because of the special handling and regulatory requirements. See, for example, the chemical transport terminal illustrated in FIG. 31 of the provisional application. Ocean Transport Intermediary (OTI) licenses are necessary for tankers and the various restrictions regarding, for example, ownership interests in the vessels and the transported goods causes such carriers to operate more independently from the shippers than in other transport modes and without the benefit of licensed third-party intermediaries with substantial logistics capabilities.

BRIEF DESCRIPTION OF THE DRAWINGS

A better understanding and appreciation of the foregoing and of the attendant advantages of the present invention will become apparent from the following detailed description of an example embodiment of the invention. While the foregoing and following written and illustrated disclosure focuses on disclosing the example embodiment of the invention, it should be clearly understood that the same is by way of illustration and example only and is not to be taken by way of limitation.

DETAILED DESCRIPTION

A preferred embodiment of the invention is a fully integrated logistics system operated by a third party intermediary for the transport of goods from a plurality of different shippers by a plurality of different carriers. The logistics system operates across all modes of transport (i.e., truck, rail, containership, bulk tanker and air) and has fill logistics supply chain capability. This provides advantages in circumstances where goods are transported across multiple modes, such as the rail/bulk truck transport illustrated in FIG. 36 of the provisional application.

Each of the modes is described later in this application. Although each transport mode has unique characteristics, standard work processes, and business requirements, a key aspect of the preferred embodiment is that enables the modes to be integrated. Various related transport business interests are shown in FIG. 14 of the provisional application along with suppliers, customers and government agencies. (Exemplary details of the transport business interests are listed in FIG. 15 of the provisional application.) By virtue of the various information available from the transport business interests, the third intermediary has leverage to identify differences between rates and negotiate intermediate rates which benefit all parties concerned. (The data interaction may be as illustrated in the examples of FIGS. 28 and 29 in the provisional application.) In the example of ocean tankers shown in FIGS. 20–22 of the provisional application, a difference of $500 is identified between the ocean tanker's rate and the rate available to the third party intermediary. The costs saving can be distributed among the parties in the manner they desire.

The logistics system of the third party intermediary is networked with the electronic systems (having back-office computing, such as ERP) of the business interests as shown in FIG. 16 of the provisional application. It preferably receives input information such as the exemplary input information shown in FIG. 19 of the provisional application. The logistics system thus allows the transactions related to the transport process to be conducted electronically and thus simplified as shown in FIG. 24 in the provisional application. The logistics system also allows documents, status reports and notices to be provided electronically as illustrated in the example of FIG. 25 in the provisional application.

Figure 1A:
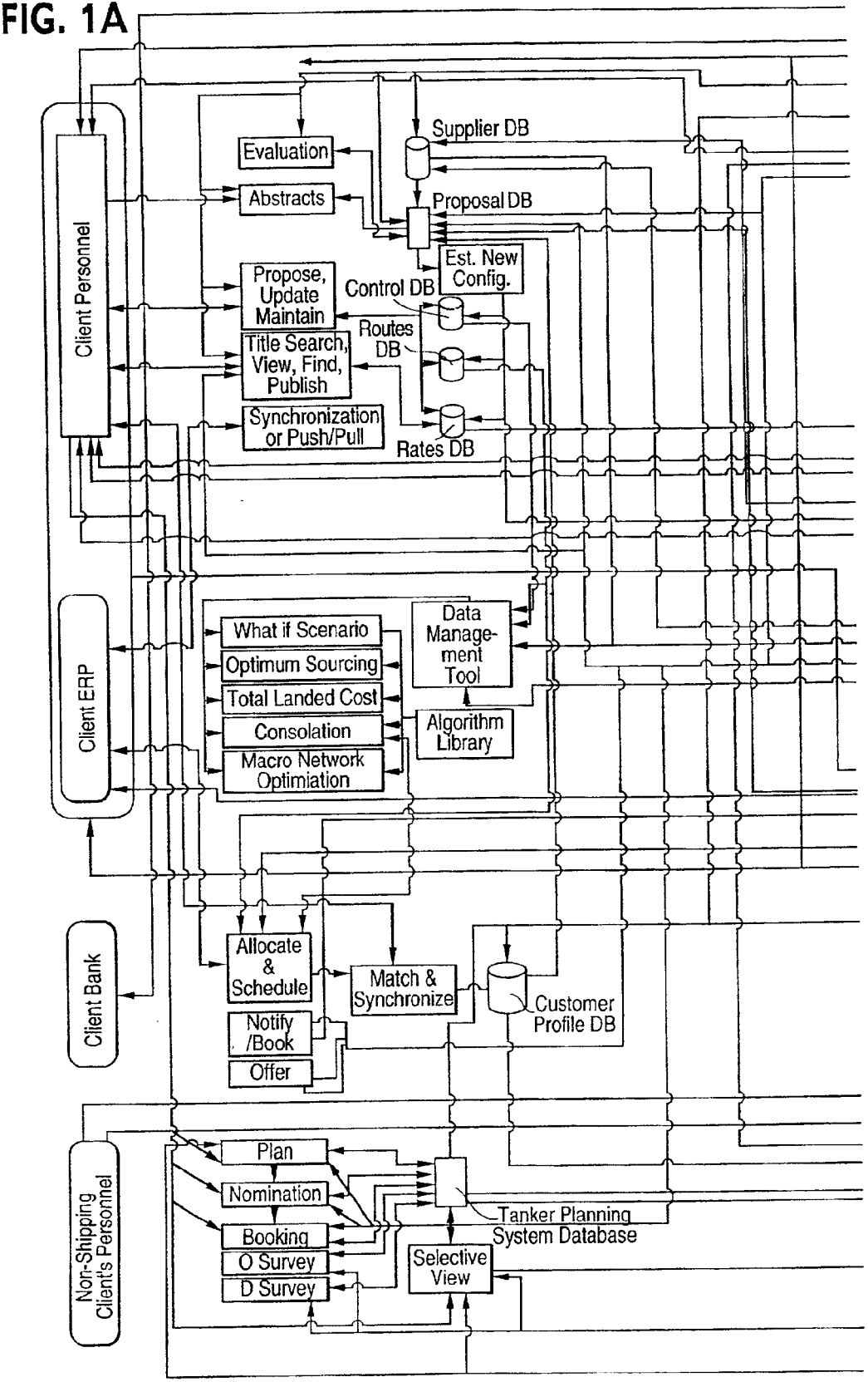
FIGS. 1A–1C is a generalized block diagram of a preferred implementation of a transport logistics system according to example embodiments of the invention.
Figure 1B:
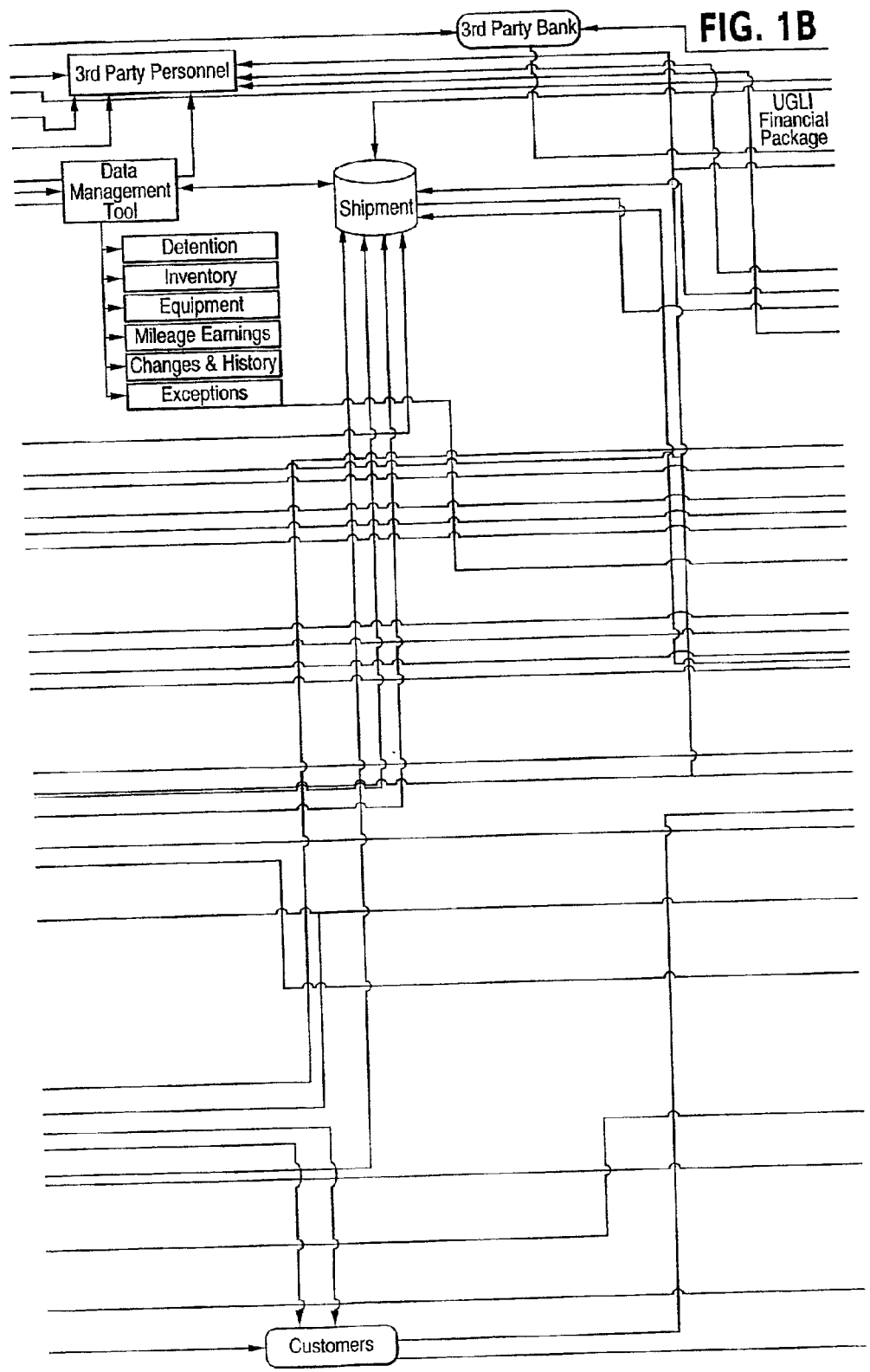
Figure 1C:
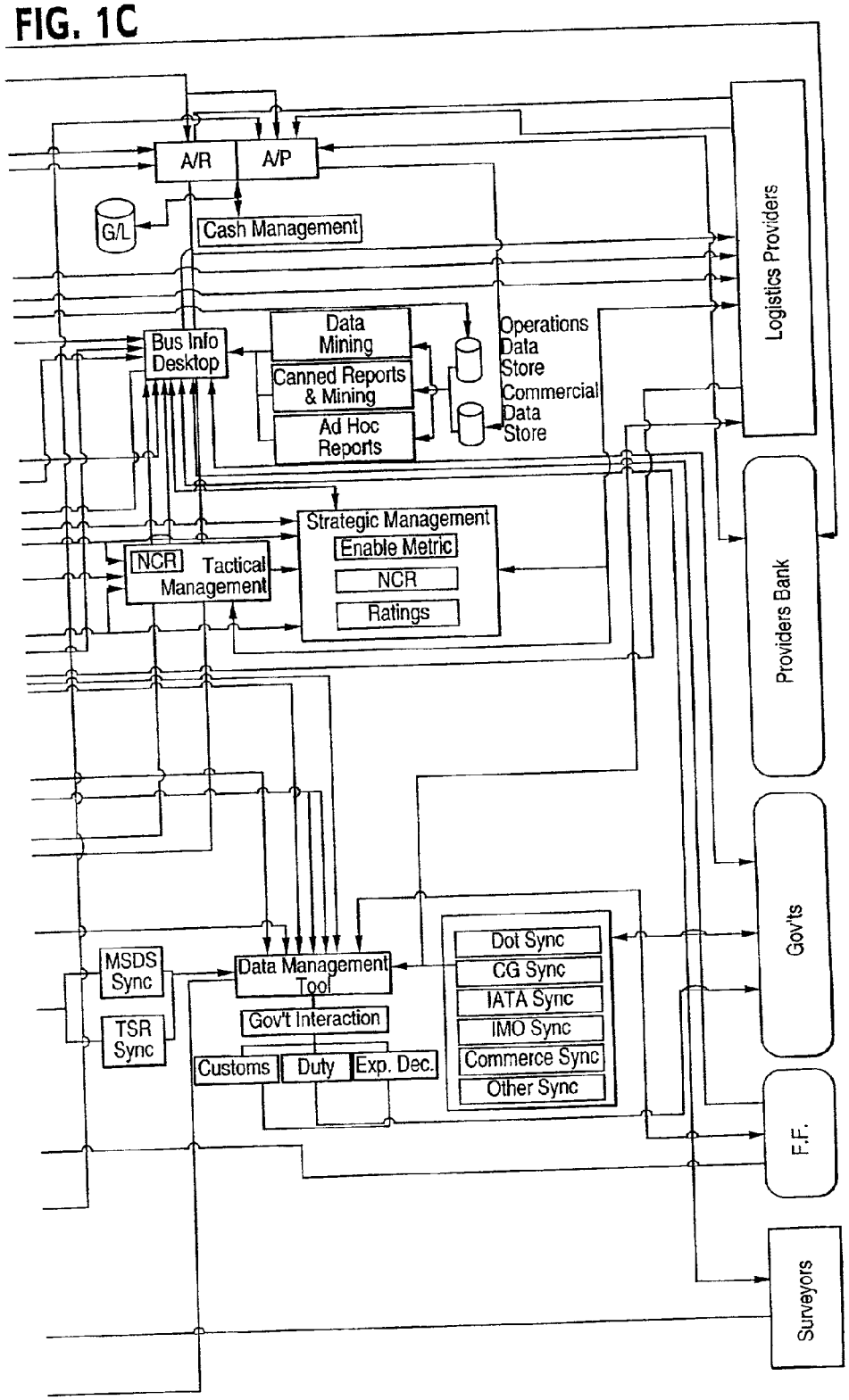
Figure 2:
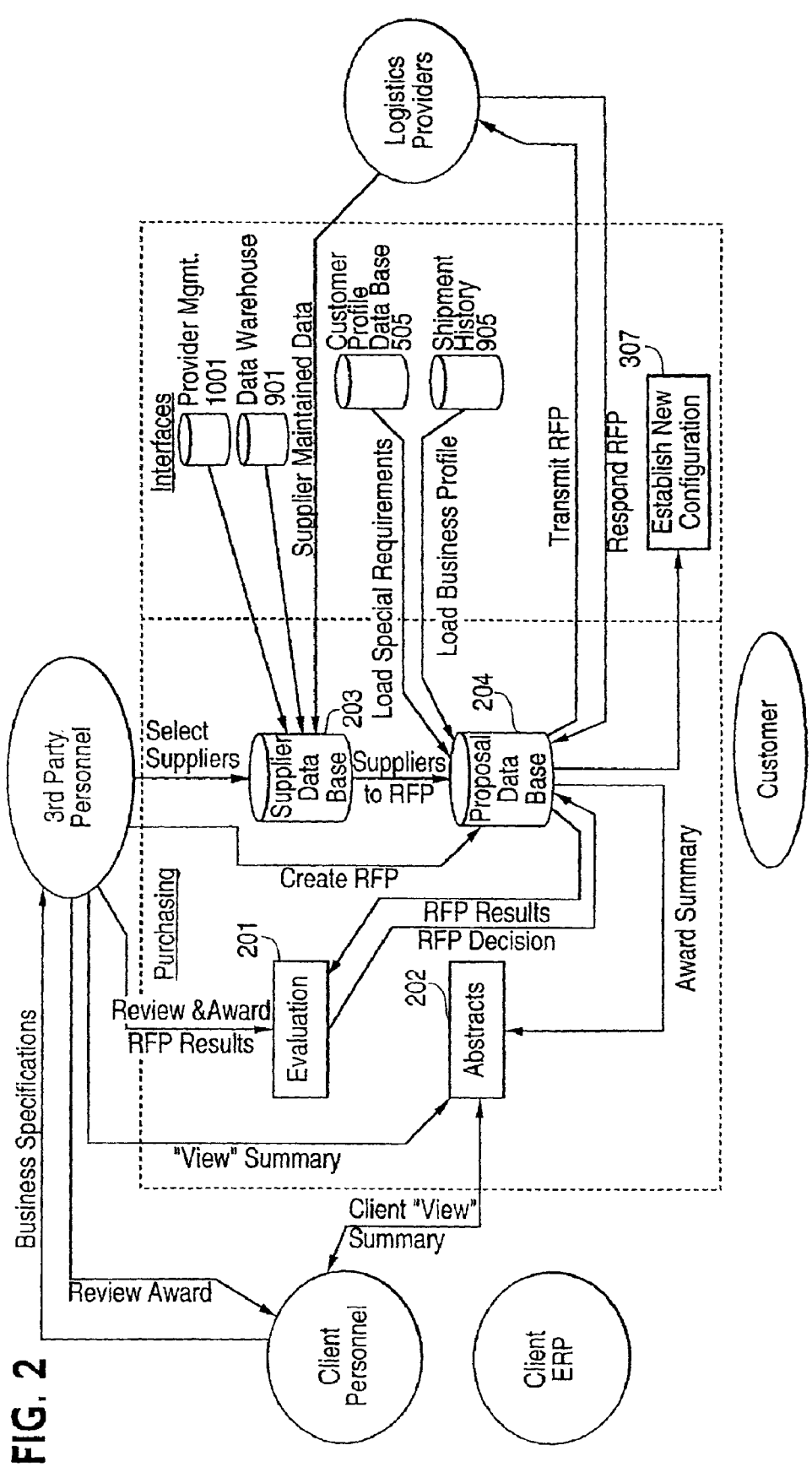
FIG. 2 is a block diagram showing certain details, including workflows, of an exemplary purchasing module in the preferred implementation shown in FIGS. 1A–1C.

A high-level overview of the architecture of a logistics system in the example embodiments of the invention in which a third party intermediary manages the logistics of shipments between a plurality of shippers and a plurality of carriers is shown in FIGS. 1 and 2 of the provisional application. Although both shippers/manufacturers and carriers utilize business and logistics applications, the focus of their respective ERP and Plant Systems are different as discussed above. The example embodiments address the problem that there is a lack of integration and information exchange between the ERP and Plant Systems of shippers and carriers.

In the example embodiments, shippers, such as manufacturers of goods, with their own respective business and logistics applications connect to the logistics system in the blue space via an integration layer. Preferably, the integration layer allows the logistics system to interface directly with a shipper's ERP and Plant systems to bring their shipment data, order data etc, into the logistics system. Likewise, on the opposite side, the logistics system integrates with the business and logistics applications of a plurality of carriers of all modes (i.e., railroad carriers, motor carriers, facilities such as terminals and warehouses, marine carriers such as tankers and container ships, etc.) and government agencies, preferably around the world. The logistics system of the example embodiments passes the customer orders (i.e., ship a load of acetone) of a plurality of shippers directly to a plurality of carriers and then provides an information flow back from the carriers to the shippers so that there is good visibility and management of shipments for all the parties involved.

The logistics system of the example embodiments preferably supports an Internet website having features as shown in FIGS. 1 and 2 in the provisional application providing controlled access to and from certain information in the system. This website connects to the various related business interests and provides the processes illustrated in FIG. 17 in the provisional application. The integration layer connections to the shippers and carriers are also preferably Internet based and made over the public Internet for global low-cost connectivity. In particular, Virtual Private Networks (VPN) with validation and encryption are preferably utilized as shown in FIG. 18 in the provisional application. Where justified by the amount of information exchange, an individual shipper or carrier may be connected to the logistics system by a private line. Furthermore, the data exchange is preferably carried out through Extensible Markup Language (XML) format running on top of the Internet Protocol layer to access the back office systems of the shippers and carriers. The XML format may be either a standardized XML format, a commercially available but non-standardized XML format or even a customized XML format developed especially for the example embodiments of the invention.

While example embodiments are described herein, the various aspects of the present invention may be used with various types of computer networks, generally including all network designs which link together disparate processing systems such as computers, servers, peripherals, storage devices, and devices for data communications. Examples of such computer networks may include a local area network (LAN), a wide area network (WAN), a campus area network (CAN), a metropolitan area network (MAN), and a global area network (GAN). LAN networks may include versions of Ethernet, FDDI (Fiber Distributed Date Interface), Token Ring, Asynchronous Transfer Mode (ATM), Fiber Channel and Wireless. The example embodiments concentrate mainly on an Internet/XML solution, although the scope of the present invention is not limited thereto. A wide variety of implementations, arrangements and configurations of terminals (e.g., host computer systems and thin clients, etc.), switches and links in all types of data networks may be utilized.

The logistics system includes a plurality of component modules. Representative functionality modules are Financials, HSE/Regulatory, Asset Management, and Rates & Routes. Representative software component modules are Hosted Financial System, and Secure Financial Processing. These software component modules may be either commercially available off-the-shelf software, customized software or independently developed software. For example, freight rate databases are commercially available. If they are robust and capable of integration with other software components to accomplish the workflows described below, then they can be utilized in the logistics system. For example, an Oracle database can be designed to provide a suitable customized freight rate database.

FIGS. 1A–1C is a connectivity diagram showing a preferred implementation of component modules making up the logistics system. Each one of the work process flows in FIGS. 2–11 are blow-ups of the individual sections of FIGS. 1A–1C showing the integration and interrelationship among the modules in the preferred implementation. (The perimeters of the modules are not shown in FIGS. 1A–1C.) The shaded blocks are part of the logistics system and the white blocks represent the external business interests to which the logistics system is networked as explained above. The personnel blocks indicate user terminals at which manual input/output interface of various information is carried out. These user terminals may be of any configuration and connect to the logistics system. Preferably, they are Internet-enabled devices capable of receiving data in the formats utilized by the logistics system, such as an XML format. These terminals need not be employees of the business interest but may instead be, for example, a third party acting as an agent for the business interest. The non-shipping client's personnel block represent client who are seeking only information (i.e., shipping rates or data reports/data mining) prior to or instead of shipping products. (See, for example, FIG. 30 in the provisional application). Although labeled as logistics provider in FIGS. 1A–1C, these blocks refer to carriers running LMS or similar software applications.

The invention is not limited to the preferred implementation shown in FIGS. 1A to 1C–11 and embodiments of the invention may use different implementations. In particular, implementations may not utilize all of the various combinations of modules shown in the preferred implementation and/or may be scalable to allow functionality modules and/or software modules to be incrementally added as resources such as personnel and budgets permit. As an example, three different implementations of logistics system, preferably but not necessarily three different installation phases of the same logistics system are described in FIGS. 39–42 in the provisional application.

Also, an implementation may be scalable to incrementally allow an increasing number of shippers or carriers or modes of carriers. Similarly, although the preferred implementation is described below with respect to the shipment of chemical and plastic products by way of example, the various aspects of the invention may easily be applied to the shipment of other products, such as furniture, retail products, commodities, equipment, etc.

Although modules are shown separately in FIGS. 1A to 1C–11, in some cases with different databases, the modules and the databases may or may not be hosted on a single computer system and may or may not be independent of each other. The logistics system may be centralized in one or relatively few locations or may be distributed throughout a relatively large number of locations. As will be made clear below, each physical shipment represents a plurality of different related work process flows, such as a shipment offer, a shipment acceptance, a customs clearance, in the logistics system. Preferably, the logistics system is a large volume logistics system with redundant modules running on multiple computer systems. For example, various databases shown as being separate in FIGS. 1A to 1C–11 may be implemented in one large single partitioned database with different interfaces for each software module.

The purchasing module is shown in FIG. 2. The key components in the purchasing module are the evaluation tool 201, the abstracts tool 202, the supplier database 203 and the proposal database 204.

Evaluation tool 201 is the main analysis tool to evaluate provider proposals and determine award. The evaluation is done by the third party intermediary and the award is determined by the third party intermediary with endorsement by the client shipper. It uses compiled Request for Proposal (RFP) data in a consistent format. It may perform either side-by-side analysis or a more sophisticated lane modeling and complex route optimization. The evaluation tool 201 is preferably able to download data into spreadsheets for manual and offline analysis.

The Abstract tool 202 provides the ability to summarize and communicate awards of a full contract into abstracts to be viewed by clients and personnel of the third party intermediary. It creates a summary high-level view of a contract and describes a business award, commitment, time period, shipments, transactions and amount of money involved, etc. There may be largely a manual process to create the abstracts, but preferably at least key fields can be selected from the RFP/contract to automatically appear in the abstract. The abstract tool 202 may be partitioned for client-specific views, in effect creating multiple abstracts for a given contract, with each abstract based on the target audience.

The Supplier Database 203 contains descriptive information on carriers, shipper requirement, approved suppliers and consolidated storage locations obtained from Provider Management 1001 and Data Warehouse 901. The data includes standard qualification data (co-ownership, financial strength, safety review information, operational capabilities, commercial & operational contact information, real title, capacity/load capability, etc.) The supplier qualification data can be adapted and customized to each individual client. The carriers also preferably maintain the information describing their capabilities (capacity, routes, etc.) themselves. The personnel of the third party intermediary reviews supplier capabilities with business needs. Any subset of the information may be included in the transmittal of the RFP. The purchasing module preferably includes the capability to individualize selection criteria based on shipper-specified approval requirements. The Supplier Database 203 preferably uses information from the provider management and data warehouse modules where actual provider performance metrics are stored.

The Proposal Database 204 contains the main commercial activity that may result in a contracted shipment. The RFP created by personnel of the third party intermediary with input from the client and the logistics system is initially stored in Supplier Database 203. Customer profile data is provided from Customer Profile Database 505. Historical data for similar moves (e.g., lane data or business shipment history) is provided from Shipment History 905 in the data warehouse module. Suppliers are targeted via candidate in the Supplier Database 203. RFPs are sent and received electronically in a consistent format. Rate data is compiled in a database/folder/table. Results are given to the evaluation tool 201 for presentation and selection by personnel of the third party intermediary. Winning proposals are sent to the Abstract process tool 202 and to the contract administration module.

The work process flow carried out by the purchasing module preferably allows the third party intermediary to act as a broker awarding shipments to the winning bidder as graphically illustrated by the global chemical tanker process illustrated in FIGS. 26 and 27 in the provisional application, the domestic bulk motor process illustrated in FIG. 33 in the provisional application or the rail transport process illustrated in FIG. 35 in the provisional application. The winning bidder may be determined by any selection criteria according to the following steps:

Carriers/logistics suppliers maintain current capabilities in the Supplier Database 203. A client electronically forwards contract requirements for a shipment to personnel of the third party intermediary. Preferably, the third party intermediary does all the negotiating between the shipper and the carriers/logistics suppliers. The third party intermediary creates the RFP for the shipment. Shipment history in the Proposal Database 204 is used to help specify lane data for the RFP. This can be performed manually until the shipment history is built over time. The third party intermediary targets suppliers based on what is in Supplier Database 203. The RFP is sent to targeted carriers/logistics providers. The carriers/logistics providers respond to the RFP and the response data is collected in the proposal database/folder/table. The third party intermediary evaluates the proposals, preferably using evaluation tool 201. The third party intermediary selects the winner to whom the shipment contract is awarded. The third party intermediary creates an abstract of the contract for general high-level dissemination of terms. The third party intermediary confirms selection with the shipper using an abstract.

The rate information is codified into a contract with rate information captured in the rate database. There are likely multiple rates: one rate is the actual rate that the third party intermediary negotiated to pay the carriers. One rate is the rate the third party intermediary is charging the shipper, which a markup by the third party intermediary for sending it to their ERP system.

Figure 3:
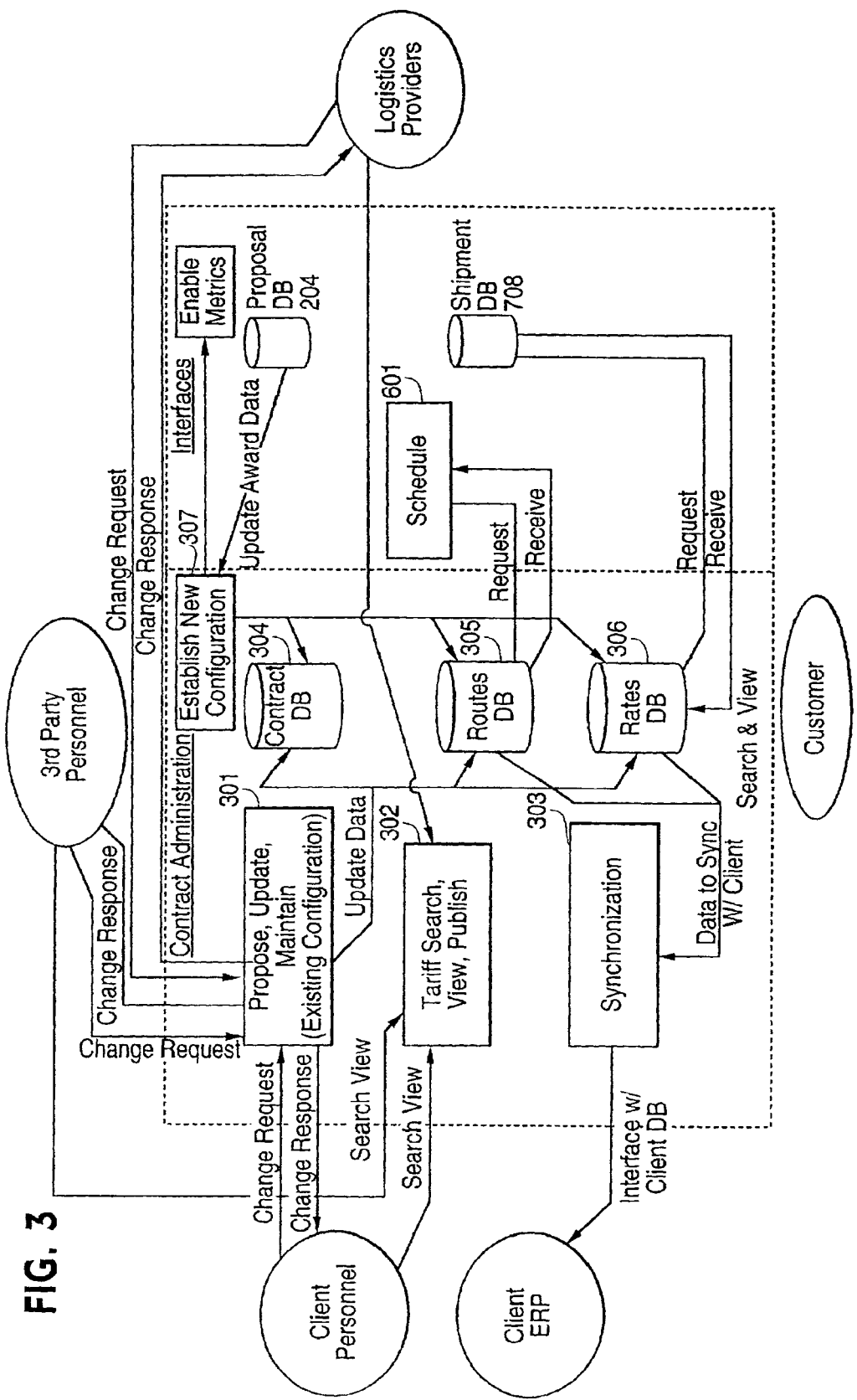
FIG. 3 is a block diagram showing certain details, including workflows, of an exemplary contract administration module in the preferred implementation shown in FIGS. 1A–1C.

The contract administration module is shown in FIG. 3. The key components of the contract administration module are the processes to propose, update and maintain existing contract configurations 301, the tariff search, view and/or publish process 302, the rates and routes synchronization process 303, the contract database 304, the routes database 305, the rates database 306 and the process to establish new contract configurations 307.

The processes to propose update and maintain existing contract configurations 301 changes or maintains contract information between the shipper, the third party intermediary and the carrier/logistics provider. It is used for minor changes to a contract, such as adding a new route or an approved rate increase, ancillary charges, etc.

The tariff search, view and/or publish process 302 views and manages tariff publications. It is preferably composed of two pieces: search and use public tariffs vs. publish a tariff for others to use based on rates and routes provided by the third party intermediary. The search and view are simply links to other sites with tariff information. It may or may not have automated functionality. There is a link to the third party intermediary rates/routes to publish/maintain tariffs. This may be done using a commercially available software package.

The rates and routes synchronization process 302 synchronizes the routes database and the rates database with the shipper's ERP system or internal databases. The third party intermediary is the source system (source of truth) for rate/route information. Each time new rate/route data is created or changed, it is packaged and sent to the shipper ERP system(s). It can be scheduled for daily, weekly, etc. updates.

Contract database 304 is the storage location for the non-route and non-rate contract information (i.e. long form contract text, service standards, etc.). It preferably handles both transportation and facility contracts. It may also be the storage location for contracts with service providers such as surveyors. It contains essential information such as names, addresses, terms, duration, authorities, liabilities, commitments, service standards, subscription rates, transaction fees, etc. Contracts between the third party intermediary and its client may also be kept in the contract database 304. Alternatively, they may be kept in a back-office system or function.

Routes database 305 is the storage location for routing guides of the third party intermediary. It is integrated with Schedule 501. It drives selection of a carrier based on origin-destination pairs for a given shipper. It can also contain preferred, second, third and fourth choices for preferred routing.

Rates database 306 is the storage location for rates of the third party intermediary with the carriers/logistics providers (transportation, facilities, and services) and with the shippers/clients. It is interacts with Shipment Database 708. Each route will likely have multiple rates (e.g., the rate the third party intermediary pays versus the rate the client pays). The rates for the clients usually will be different from the rates being paid to the carriers. The spread between these rates is the revenue source for the third party intermediary and the other participants as described above. The markup is variable by client, contract, and/or route. It may be a percentage, flat rate, dollar amount per unit, etc. Clients only have access to rates of the third party intermediary, not the rates of the carriers/logistics providers. The rates database is preferably available across different carrier modes.

The established new contract configuration process 207 establishes a new contract, route or rate configuration (beyond maintenance as per B.1) which the logistics system will execute. 301 is a subset of this process. Winning proposals provide the trigger point for new contracts to be established. Data from the proposal is converted to a contract and the rates and routes established. This process establishes the markup and the rate is stored in Rates Database 306. Upon establishment of the contract, standards against which performance is measured is set up in the system when reporting metrics.

Figure 4:
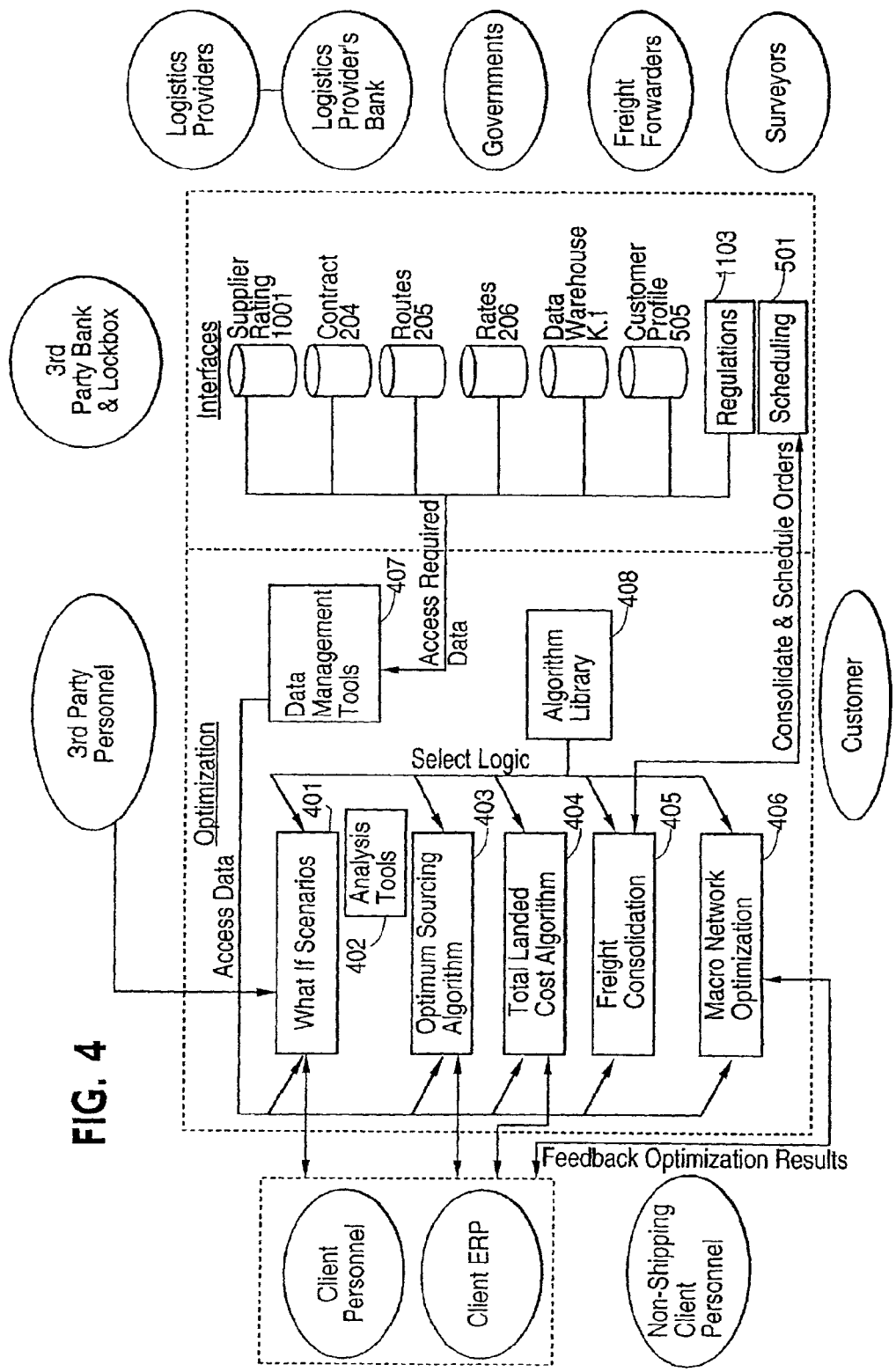
FIG. 4 is a block diagram showing certain details, including workflows, of an exemplary optimization module in the preferred implementation shown in FIGS. 1A–1C.

The optimization module is shown in FIG. 4. The key components of the optimization module are What If Scenarios 401, Analysis Tools 402, Optimum Source Algorithm 403, Total Landed Cost Algorithm 404, Freight Consolidation 405, Macro Network Optimization 406, Data Management Tool 407 and Algorithm Library 408.

What If Scenario 401 allows the shipper and the third party intermediary to perform ad hoc logistics scenario analysis. Relevant system information from other parts of the logistics system are gathered and supplied via the Data Management Tool 407. What If Scenario 401 facilitates the automation of manual processes such as path route mode comparisons, side by side carrier comparisons and cost vs. service comparisons. Analysis Tools 402 provide analytical tools to 401.

Optimum Sourcing Algorithm 403 allows the shipper (personnel and/or ERP) and the third party intermediary to perform enterprise configuration of optimum shipping locations for product sourcing. Routes, rates and transit times are all available via the Data Management Tool 407. The logic of the algorithm is fairly simple, but becomes complex as the shippers network of shipping locations and customer base becomes large. The output of Optimum Sourcing Algorithm 403 is in a format friendly for the client shipper.

Total Landed Cost Algorithm 404 allows client shipper personnel and the third party intermediary to calculate the total landed cost of an international shipment. Landed cost involves freight for each leg, duty, tax, etc. It may be automated or it may employed in response to an individual request (non-ERP). The Total Landed Cost Algorithm 404 uses both domestic and international rates stored in the logistics system.

Freight Consolidation 405 allows a client shipper's ERP to review orders and look for an opportunity to consolidate less-than-truckload (LTL) and less-than-container (LTC) shipments into full truck loads and containers. It receives an electronic feed from the scheduling module and reviews LTL and LTC order for geographic and delivery overlaps. It is able to combine orders into a single shipment (booking, manifest, Bill of Lading (BOL), etc.) and schedule the consolidated order in conjunction with Scheduling 501. Freight Consolidation 405 is preferably employed to either/both multiple drop-offs at destination or single warehouse destination with local LTL deliveries. It produces a savings for client shippers not already consolidating due to lack of manpower.

Macro Network Optimization 406 allows the third party intermediary to make distribution network efficiency changes for a client shipper from to a high level analysis of the client's network and its own corresponding overall network. This capability is a paradigm shift in the management of logistics networks. It may be provided as a value added service in the data mining capability of the logistics system with its own pricing structure. The sophisticated logic software is preferably developed in conjunction with the logistics network of the third party intermediary.

Data Management Tool 407 allows the above optimization tools 401 to 406 to access the requisite information in Supplier Rating 1001, Contract 204, Routes 205, Rates 206, Data Warehouse 901, Customer Profile 505 and Regulations 1103. It provides logic and architecture to access all main data areas of the logistics system. Algorithm library 408 provides the requisite logic to support the optimization activities in the above optimization tools 401 to 406.

Figure 5:
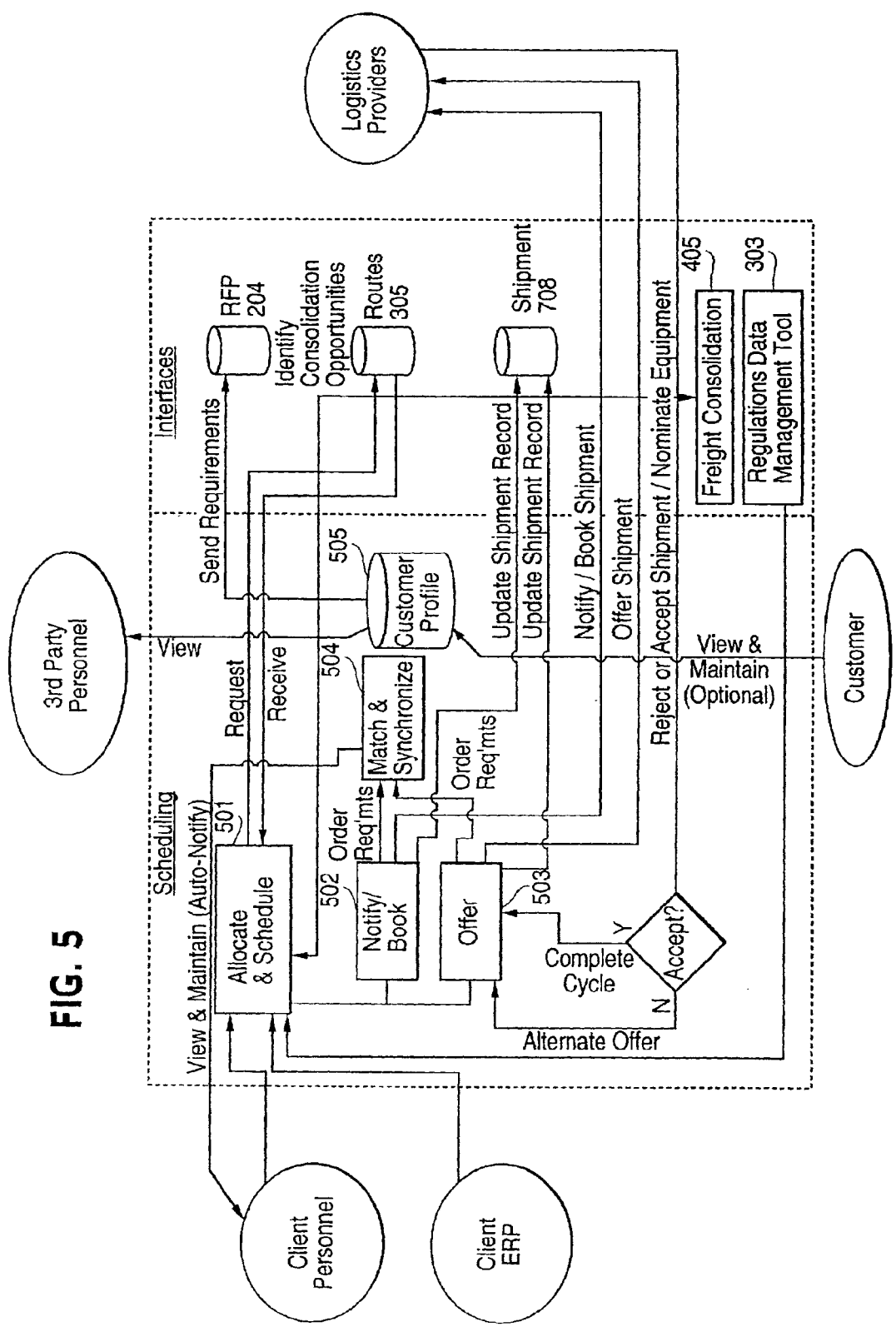
FIG. 5 is a block diagram showing certain details, including workflows, of an exemplary scheduling module in the preferred implementation shown in FIGS. 1A–1C.

The Scheduling Module is shown in FIG. 5. The key components of the scheduling module are Allocate and Schedule 501, Notify/Book 502, Offer 503, Match & Synchronize 504, and Customer Profile Database 505.

Allocate and Schedule 501 allows a client shipper's ERP order stream to be routed in conjunction with Routes 305 and then scheduled for shipping in the logistics system. It preferably is a web enabled solution which receives ERP data via the Internet and XML. It uses Freight Consolidation Logic 405 to identify LTL and LTC consolidation opportunities and uses Route Guides 305 and Regulations Data Management Tool 1103 to identify the proper carrier/logistics provider. Allocate and Schedule 501 is the first point of handoff to the logistics system from a client shipper's ERP and, depending on mode of carrier, sends order sets to either Notify/Book 502 or Offer 503. It allows strategic order management rather than tactical order management.

Notify/Book 502 sends ERP order sets over the Internet to a carrier/logistics provider to notify them of the shipment and supply them the basic shipment data. It also updates the corresponding shipment record in Shipment Database 708. It is used for transportation modes such as rail and LTL where shipment tendering is automatic (i.e. pickups are routine or never turned down).

Offer 503 sends ERP order sets over the Internet to carriers/logistics providers to offer the shipment for carriage. It is used for transportation modes (such as truckloads, bulk truck, pack marine and air) where shipment tendering is not automatic (i.e. pickups are not routine and/or there is an opportunity for a turn down. The carrier/logistics provider reviews requirements and accepts, accepts with conditions or rejects the shipment offer. Acceptance/Rejection acknowledgment logic is used to book or reoffer the shipment to another carrier/logistics provider. It also updates the corresponding shipment record in Shipment Database 708.

Match & Synchronize 504 calibrates the customer profiles between the client's ERP, the carrier/logistics provider's TMS and logistics. Customer Profile Database 505 maintains customer profiles which may be sent to RFP 204 and viewed by outside personnel.

Figure 6:
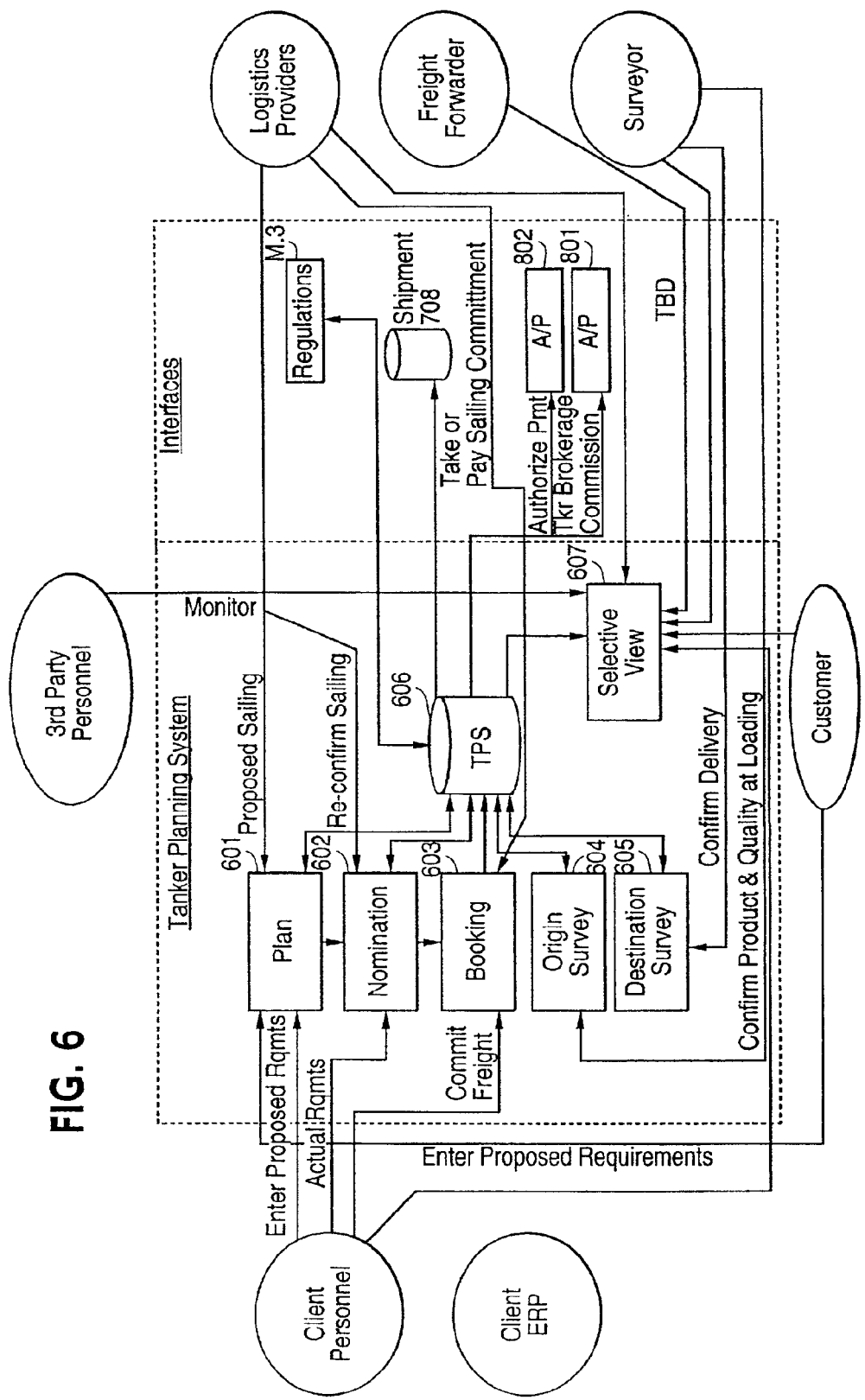
FIG. 6 is a block diagram showing certain details, including workflows, of an exemplary tanker planning system (TPS) module in the preferred implementation shown in FIGS. 1A–1C.

The Tanker Planning System (TPS) Module is shown in FIG. 6. The key components of the TPS module are Plan 601, Tentative Nomination 602, Booking 603, Origin Survey 604, Destination Survey 605, Tanker Planning System (TPS) Database 606 and Selective View 607.

In Plan 601, the client/shipper, ship owner and/or customer collaborate on long range (i.e., 90 days) product forecasts and ship sailing schedules. Data is recorded in the TPS database. Clients and/or potential customers enter their forecast for shipments (arrivals). Ship owners typically don't share their position data since such information may be used to their disadvantage by customers. For example, if a customer knows that a ship is empty and in need of cargo, they may request an unfavorable rate less than standard rates. Therefore, Plan 601 includes security/partitioning so that no party other than the ship owner (and the third party intermediary) can directly access its data.

In Tentative Nomination 602, shipper/clients and ship owners collaborate on more near term product requirements (i.e., 30 days) and ship sailing schedules. Tentative commitments are made. Data is recorded in the TPS database 606. Data from planning is imported into Tentative Nomination 602 and then confirmed. There is no commitment until the booking step by Booking 603.

Take or pay commitments are established between Clients and the Ship Owners in Booking 603. Data is recorded in the TPS database 606. Booking occurs between 10 and 15 days before the first day of the 15 day window for loading. Product needs to be ready to load on the first day of the window. Nominations are confirmed and definitive commitments are made. This is administrating a shipment against a previously established contract. Loading communication is sent to ship owner, surveyor, and terminal. Freight rates are loaded into the TPS database 606 during booking.

Product and quantity data is confirmed by the loading survey in Origin Survey 604 and entered into the TPS system. The third party intermediary arranges the contract with the surveyors globally. The terminal schedules the surveyor to come in to do the survey. The surveyor takes samples and also takes them to the terminal's lab. Data is recorded in the TPS database 606.

Product and quantity data is confirmed by the un-loading survey in Destination Survey 605 and entered into the TPS system. The third party intermediary arranges the contract with the surveyors globally. The receiving terminal schedules the surveyor to come in to do the destination survey. Surveys are conducted at the end as proof of delivery and to avoid auditing freight bills later. Data is recorded in the TPS database 606.

The Tanker Planning System (TPS) Database is preferably a relational database storing collaborative data between client/shipper, customer, surveyors, freight forwarders, and ship owners. It is the main data store for all TPS work processes. It is highly preferable that there be security and partitioning of data stored in the TPS Database 606.

The Selective View 607 provides partitioned access to the TPS module and is preferably managed separately for each participating party. It interfaces to Shipment Database 708, Accounts Receivable 801, Accounts Payable 802 and Regulation Data Management 1103.

Figure 7:
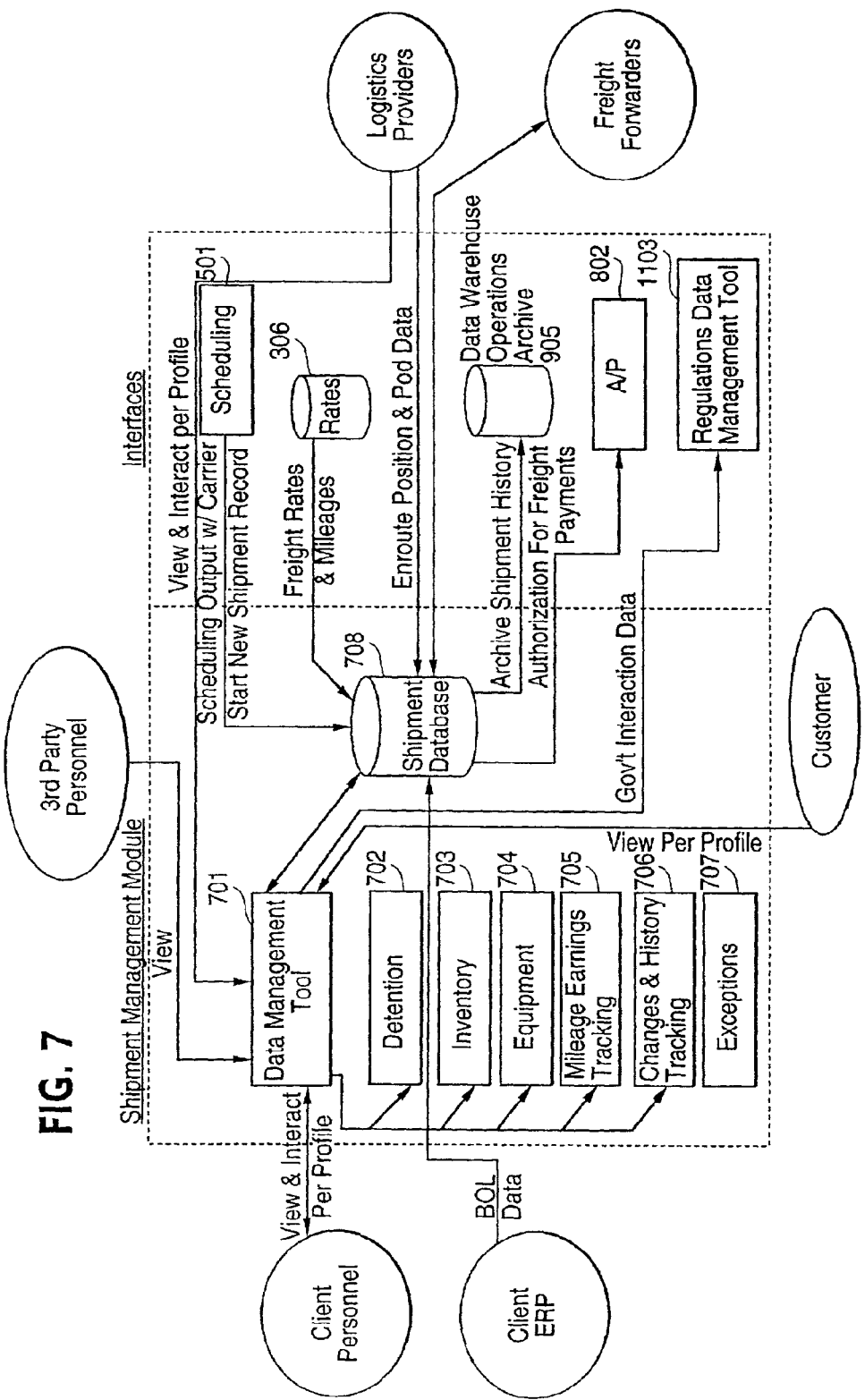
FIG. 7 is a block diagram showing certain details, including workflows, of an exemplary shipment management module in the preferred implementation shown in FIGS. 1A–1C.
Figure 8:
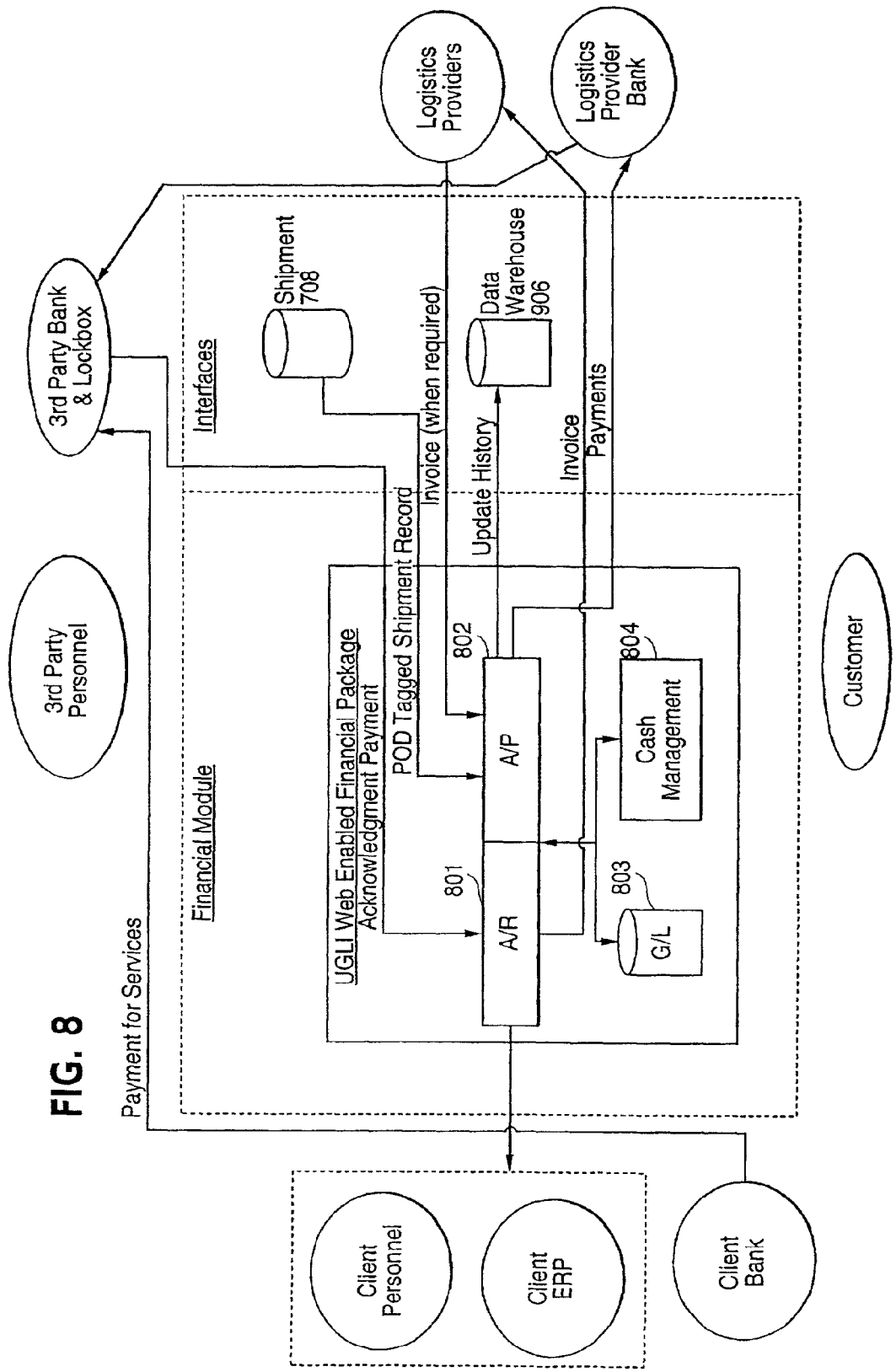
FIG. 8 is a block diagram showing certain details, including workflows, of an exemplary financial module in the preferred implementation shown in FIGS. 1A–1C.

The Shipment Management Module is shown in FIG. 7. The key components of the shipment management module are Data Management Tool 701, Detention 702, Inventory 703, Equipment 704, Mileage Earnings Tracking 705, Changes and History Change Tracking 706 Exceptions 707 and Shipments Database 708. They provide a significant reduction in administrative work on behalf of the shipper and carrier as illustrated in the example domestic motor transport process illustrated in FIG. 34 in the provisional application.

The general ledger of the third party intermediary is maintained in General Ledger 803. The cash float and currency positions are managed by the treasurer with assistance of Cash Management 804. These are standard functions and are preferably achieved by commercially available software applications.

Figure 9:
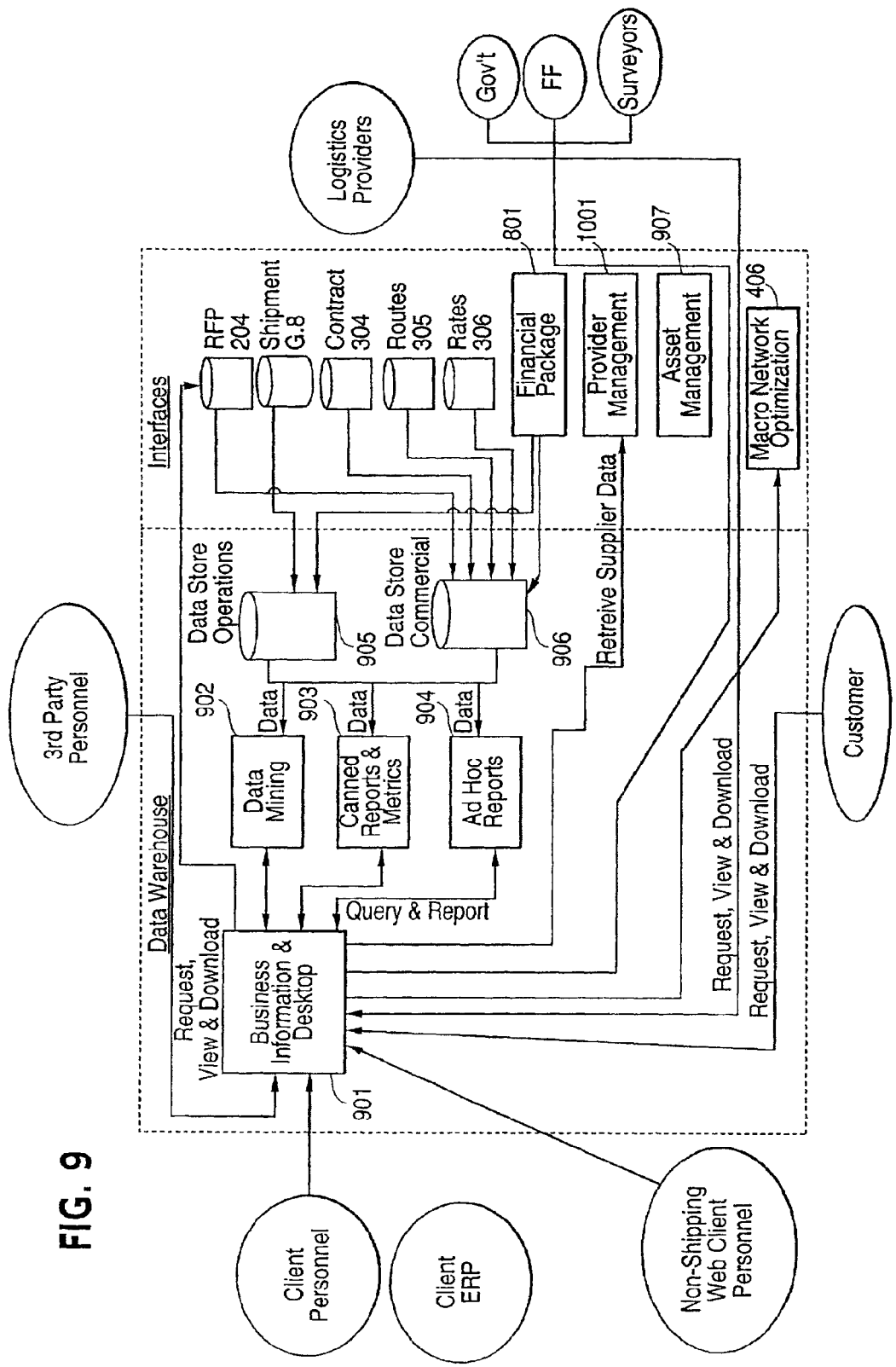
FIG. 9 is a block diagram showing certain details, including workflows, of an exemplary data warehouse module in the preferred implementation shown in FIGS. 1A–1C.

The Data Warehouse Module is shown in FIG. 9. The key components of the data warehouse module are the Business Information Desktop 901, Data Mining 902, Metrics & Canned Reports 903, Ad Hoc Reports 904, Operations Data Store 905 and Commercial Data Store 906.

Business Information Desktop 901 is a front end interface to data reporting from the various sources in the logistics system. It provides access to metric reporting, canned reports, and the ability to create ad hoc queries and perform data mining. It retrieves data from RFP 204 and Provider Management 1001. Data reports are downloadable to desktop applications such as spreadsheets, etc. Clients can only view their own data and the data that they authorized to see. User security is integral to the data warehouse module. Security can be controlled by role and is preferably very rigorous.

Data Mining 902 aggregates and repackages data for sale and other various uses. It is used to identify trends and high-level trends in the data. It contains high-powered selection, filtering, and manipulation capabilities for large users.

Metrics and Canned Reports 903 generates routine canned reports from Operations 905 and Commercial Archives 906. The reports are defined by end-users and SMEs. They can either be pre-generated or run-on-demand against reporting data sources, not operational transaction databases. Data may be current, but not real-time. Data sources are refreshed on schedule.

Ad Hoc Reports 904 generates spot ad hoc reports from Operations 905 and Commercial Archives 906. The reports are created and run-on-demand against reporting data sources, not operational transaction databases. Data may be current, but not real-time. Data sources are refreshed on schedule.

Transaction-oriented operational data is downloaded from Shipment Database 708, aggregated, and otherwise manipulated in Operations Data Store 905 to provide ready and convenient access for reporting with the assistance of Financial Package 801. The focus is on shipments. Data is refreshed on a regular basis (daily/weekly, etc.), but is not real-time.

Commercially oriented data is downloaded from RFP 204, Contract 304, Routes 305 and Rates 306, and otherwise manipulated in Commercial Data Store 906 to provide ready and convenient access for reporting with the assistance of Financial Package 801. The focus is on suppliers, contracts, and rates. The data is refreshed on a regular basis (daily/weekly/monthly), but it is not real time.

Figure 10:
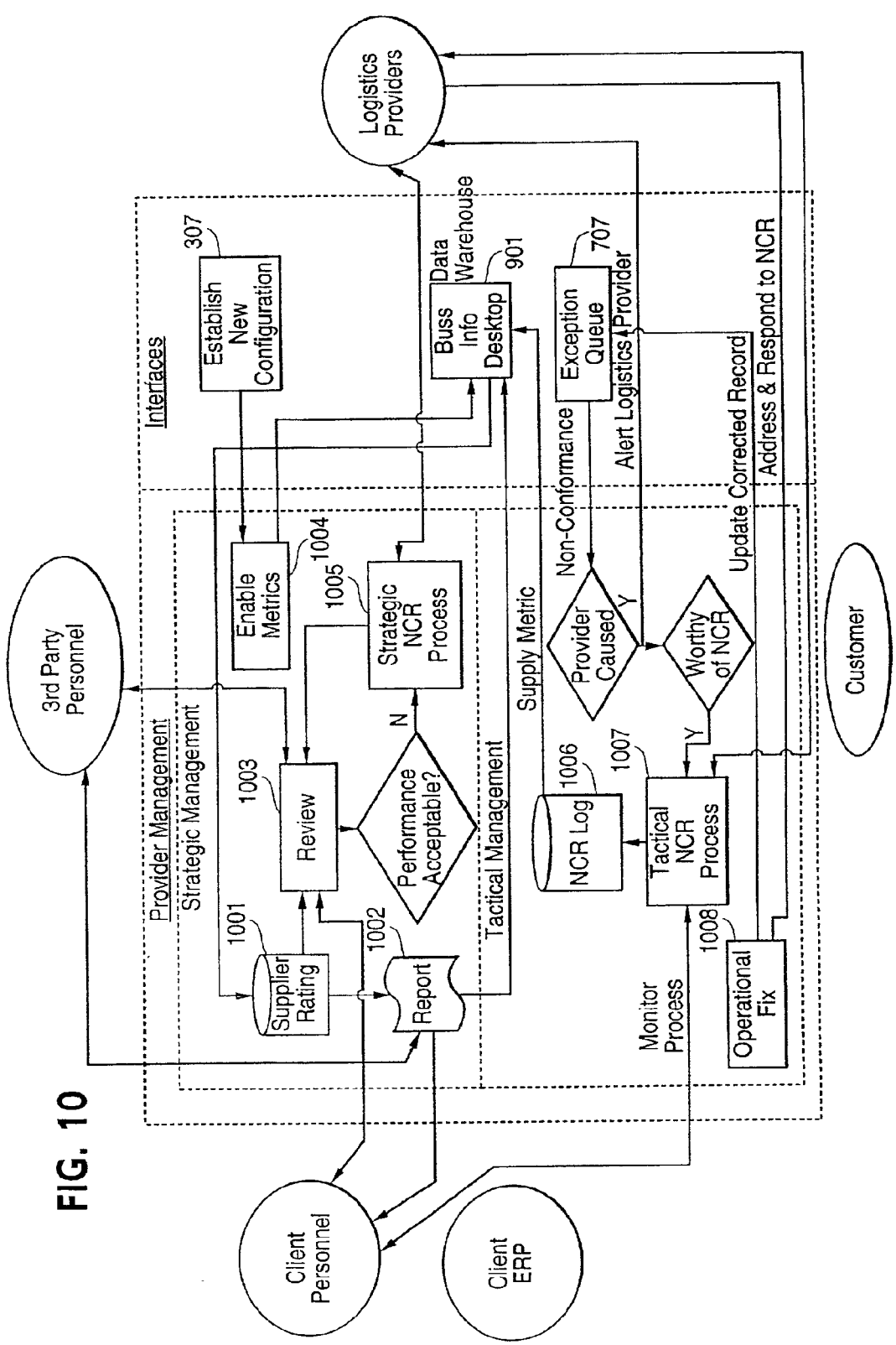
FIG. 10 is a block diagram showing certain details, including workflows, of an exemplary provider management module in the preferred implementation shown in FIGS. 1A–1C.

The Provider Management Module is shown in FIG. 10. The key components of the provider management module are Supplier Rating 1006, Rating Report 1002, Performance Review 1003, Enabling Metrics 1004, Strategic Nonconformance Reporting Process 1005, Nonconformance Report Log 1006, Tactical Nonconformance Reporting Process 1007 and Operational Fix 1008.

Supplier Rating 1001 executes the supplier rating process using an interface to Business Information Desktop 901. Rating Report 1002 publishes the output of the supplier rating process executed by Supplier Rating 1001 using an interface to Business Information Desktop 901.

Performance Review 1003 allows client/shipper and/or third party intermediary personnel to review the supplier's performance for suitability as output from Metrics 1004, NCR 1005 and Supplier Rating 1001. Enabling Metrics 1004 loads the metric requirements as determined by the purchasing module so the system can auto-calculate and track a supplier's performance using interfaces to Business Information Desktop 901 and Establish New Configuration 307.

If Performance Review 1003 reveals unsatisfactory performance, Strategic Nonconformance Reporting Process 1005 initiates a request for systemic supplier performance improvement. Nonconformance Report Log 1006 is maintained of all the tactical NCR events for later systemic review and evaluation in Strategic Provider Management. Tactical shipment nonconformance events are registered and providers requested for corrective action in Tactical Nonconformance Reporting Process 1007. Providers can correct nonconformance using Operational Fix 1008 and update the corrected record using Exception Queue 707.

Figure 11:
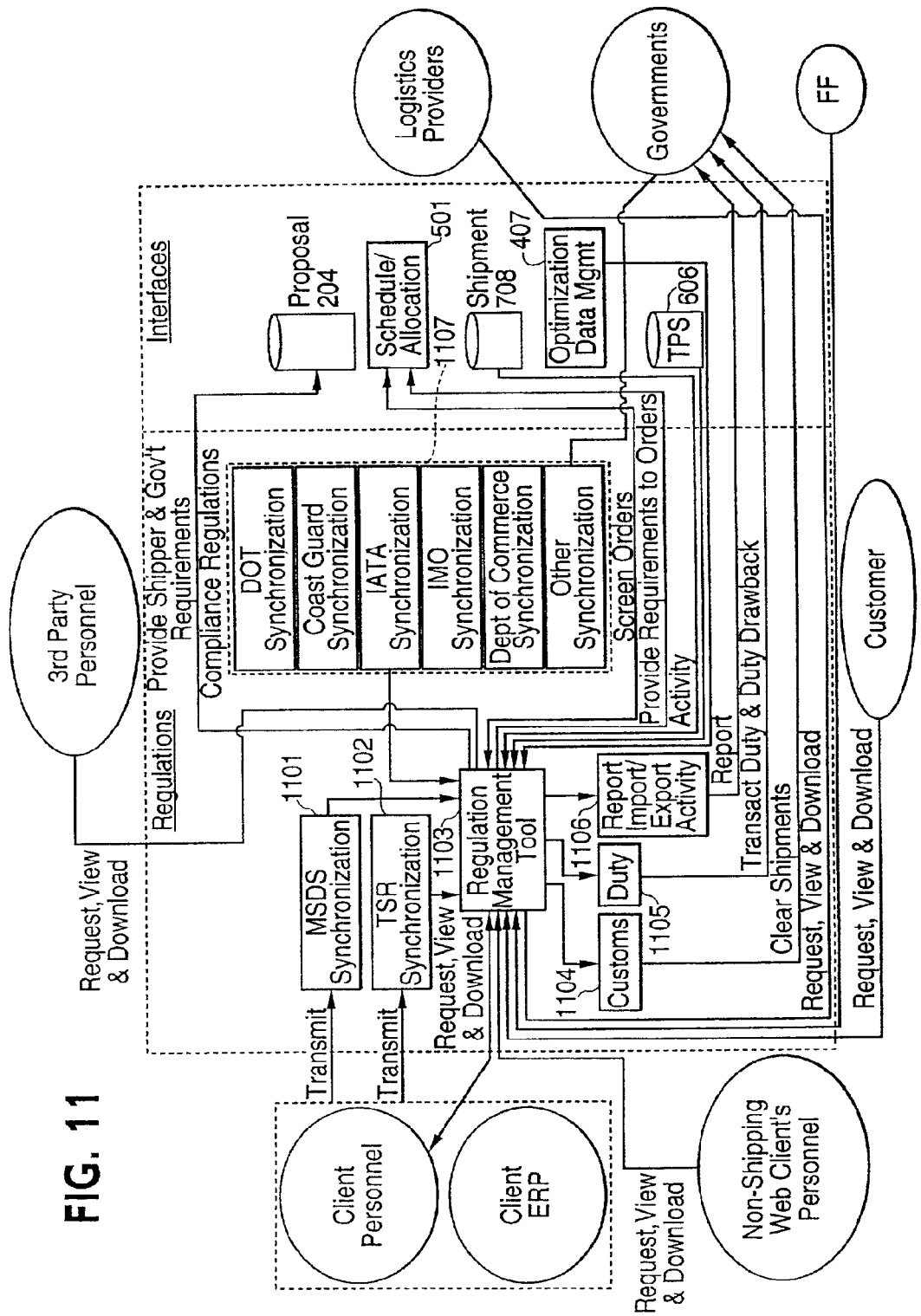
FIG. 11 is a block diagram showing certain details, including workflows, of an exemplary regulations module in the preferred implementation shown in FIGS. 1A–1C.

The Regulatory/Health & Safety Module is shown in FIG. 11. The key components of the Regulatory/Health & Safety Module are MSDS Synchronization 1101, TSR Synchronization 1102, Data Management Tool 1103, Customs 1104, Duty 1105, Reporting of Export/Import Activity 1106 and Compliance Information & Regulations 1107.

This module has significant integration with the shipment module. It may also be combined with data mining in the data warehouse module. The transactional activities are separated from the informational presentations. Preferably, data from this module, such as a Table of Denials, blocks an order from being shipped.

MSDS Synchronization 1101 provides a link access and makes a client/shipper MSDS information available for download to the logistics system. Preferably, the MSDS information downloads are kept up-to-date and are in a bit-mapped file format, such as PDF, so that they can't be edited. TSR Synchronization 1102 links the client's Transportation and Safety Record (TSR) information and makes it available to the logistics system. The TSR information contains both informational and transactional data (copy of information tied to the order). The clients are the only owners of the MSDS and TSR information. The logistics system can either keep a copy of the downloaded MSDS and TSR information or simply pass them through to the shipper.

Regulation Data Management Tool 1103 is the focal point to coordinate all of the regulatory, safety and compliance information in the system. It is the end-user interface to the data in the module. It interfaces with RFP 204, Schedule/Allocation 501, Shipment Database 708, Optimization Data Management 407 and TPS 606.

Customs 1104 executes the customs reporting requirements. It includes transactional activity and information including shipper, country of origin, product, value, recipient, vessel, etc. Customs 1104 also prepares documents to facilitate clearing customs and recording when customs has been cleared.

Duty 1105 executes the duty and duty drawback calculations and provide the reporting to the government. It includes transactional activity. Duty occurs with the shipment. Duty drawback is calculated after-the-fact. The duty can be calculated in various phases as the logistics system is improved. For example, at first it could perform calculations for U.S.-imports only.

Report Import/Export Activity 1106 executes the transactional reporting requirements for export and import activity. Like Customs 1104, it handles transactional activity and prepares documents to report to the census and other government bureaus to record inbound/outbound transaction.

Compliance Regulations 1107 links and makes available information for all the pertinent regulatory and/or professional compliance standards. It may be a link or a copy that needs to be kept synchronized. It is similar to MSDS Synchronization 1101 and TSR Synchronization 1102, except that source data is from the government and/or professional/standards organizations. Preferably, it includes DOT Synchronization, Coast Guard Synchronization, IATA Synchronization, IMO Synchronization, Department of Commerce Synchronization and Other Synchronization.

An important aspect of the preferred embodiment is that while it is integrated to operate across several different transport modes, it does not utilize generic work processes or business requirements for each one of the transport modes. Rather, it utilizes the work processes or business requirements which are best suited to each individual transport mode. Furthermore, these transport mode specific work processes and business requirements are integrated throughout the various modules of the logistics system, such as purchasing, contract administration and provider management module.

As an example of the integration of transport mode specific processes, in the purchasing module, consider the information necessary to arrange for the shipment of goods through a RFP or other purchasing procedure. This information includes, for example, data items relating to terms and conditions, type of goods, origins/destinations, rate structure, term of contract, equipment specifications, safety, service requirements and special requirements. In the preferred embodiment, this information is different for each one of the transport modes. To illustrate the differences, example of data items are now given for several different transport modes. However, these data items are merely exemplary and may be modified as desired in any particular implementation.

As bulk truck transport mode data items, the commodities may include product names; lane data may include origin/destination pairs and single vs. multi-compartment; origins/destinations may include plant or terminal, address/county/zip code, hours of operation, scale availability, loading throughput, and driver role; rate structure may include minimums, $PLM, CWT, point to point, zip codes, counties and free-time standard; term of contract may include duration of boilerplate or escalation provisions; equipment specifications may include cleanliness standards, payload standards, fleet compartment profiles, ancillary equipment, Food USPFDA, and Kosher Grade capabilities; safety may include satisfactory DOT rating; satisfactory rating by a commercial party (such as the third party operating the logistics system), and handling and communication; service requirements may include hours of operation, communication, electronic interfaces, response times and teams; and special requirements many include non-typical facility and handling issues.

The data items for truck load transport mode may differ from those for bulk truck transport, particularly for equipment specifications, which may indicate, for example, length, reefers, payload standards. The safety data items may indicate blocking and bracing. The service requirements may include consolidations, multi-stopoff and transit standards.

The data items for less than truckload (LTL) transport mode may also differ from those for truck load transport. For example, the service requirements may include expedited service, liftgate service and diversions.

The data items for rail transport mode may differ substantially. For example, the lane data may include annual volumes and average weight; the origins/destinations may include serving railroads, open/closed status, storage track, and maximum gross weight; the rate structure may include zero or full mileage, discounts; the equipment specifications may include payload standards; the safety data items may include hazmat regulations; and the service requirements may include SIT requirements.

For containership transport mode, the origins/destinations ports may include ship sailing schedule, door to port, port to port, port to door, and door to door; the rate structure may include volume commitments, equipment size and type costing model, freetime, deadfreight, all-in and surcharges; the equipment specifications may indicate 40 feet or 20 feet containers, reefers, iso-tanks, high cubes, flat racks, etc; the safety data items may include stowage requirements and Hazmat; and the service requirements data items may include frequency of sailings and transit times and space requirements.

As bulk tanker transport mode data items, lane data may include load/discharge ports and annual tonnage; data items for load/discharge ports may include berth particulars (LOA, Draft, etc.), receiving capability (tank sizes, pump rate, nitrogen availability) and surveyor information; rate structure may include parcel size costing model, laytime, demurrage, shifting fees, and grade allowances; equipment specifications may include tank specifics (stainless, coated, etc.) and vessel age; safety may include compliance with U.S. and IMO regulations, port of destination country requirements; and service requirements may include number of sailings per year and communication (ETA updates, position lists, etc.)

As for air cargo transport mode data items, the lane data may include door vs. airport and tonnage; the origins/destinations may include airport—airport, door—airport, door—door; the rate structure may include dynamic data items; the equipment specifications may include payload standards and fleet profile; the service requirements may include freight forwarder role, customs, duties, tax, export declaration, transit 24/7 and flight schedules; and the special requirements data items may include RAC requirements, dimensional capability and heavy lift capability.

As other examples of the integration of transport mode specific processes, the database in the purchasing module, may contain different data items for shippers and carriers in one transport mode than for shippers and carriers in another transport mode. The provider management module may utilize different key performance indicators, different qualification criteria and different quality rating algorithms for different transport modes. As another example, the contract administration module may utilize different information for different transport modes, such as rate surcharges, ancillary items, etc.

Although a preferred implementation of the example embodiments, the invention is not limited to the logistics system shown in FIGS. 1–11. Indeed, there are many aspects and advantages of the example embodiments of the invention that may be particularly useful and widely adaptable for use independently of other aspects and advantages of the example embodiments of the invention. In this way, transport logistics systems and methods can be efficiently provided for a plurality of shippers and carriers.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. An integrated logistics system for managing the shipments of goods supplied from a plurality of different shippers by a plurality of carriers, said system comprising:
    a purchasing module evaluating proposals by shippers for respective shipments of goods and awarding contracts for the shipments to the plurality of carriers;
    a contract administration module maintaining information relating to the status of proposals received and contracts awarded by the purchasing module;
    a scheduling module scheduling shipments according to the awarded contracts;
    a shipment management module tracking the status of shipments awarded by the purchasing module and scheduled by said scheduling module, said shipment management module including or being connected to a relational database logging and storing the shipment records of said shipments, wherein changes to said shipment records in the first relational database are allowed to be controlled and tracked per audit protocols and the history and changes made to/during a shipment are allowed to be viewed;
    a financial module authorizing payments according to the status of shipments tracked by the shipment management module;
    a network configured to transfer information between said shipment management module and at least one module of a group consisting of said purchasing module, said scheduling module, said contract administration module, and said financial module, said at least one module including or being connected to a second database; and
    at least one computer, said at least one computer connected to said network and configured to execute a computer program of said purchasing module, contract administration module, scheduling module, shipment management module, and financial module, to process said information transferred by said network.

2. An integrated logistics system according to claim 1, wherein the plurality of carriers includes ship owners and the logistics system includes a tanker planning module.

3. An integrated logistics system according to claim 2, wherein the tanker planning module includes a partitioned relational database storing collaborative data relating to shippers, freight forwarders and ship owners.

4. An integrated logistics system according to claim 3, wherein access to each partition in the relational database of the tanker planning module is selectively controlled and managed so that contracts between shippers and ship owners can be awarded by the purchasing module without revealing the confidential information of one party to the other.

5. An integrated logistics system according to claim 1, further comprising a data warehouse module storing operations data received from the shipment management module and commercial data received from the financial module.

6. An integrated logistics system according to claim 5, wherein the data warehouse module selects, filters, aggregates and repackages said operations data and commercial data to generate data mining, metrics and predetermined reports, and customizable reports.

7. An integrated logistics system according to claim 6, wherein the data warehouse module includes a front end interface offering secured access and controlled transfer between the data warehouse module in computer readable format.

8. An integrated logistics system according to claim 1, further comprising a carrier management module which tracks the performance of carriers and generates ratings of the carriers.

9. An integrated logistics system according to claim 8, wherein the carrier management module receives information from the front end interface of a data warehouse module.

10. An integrated logistics system according to claim 8, wherein the carrier management module receives metric requirements from a contract administration module.

11. An integrated logistics system according to claim 8, wherein the carrier management module receives exception information indicating shipment problems from an exception queue in the shipment management module.

12. An integrated logistics system according to claim 1, further comprising a regulatory module collecting information from other modules of the system and providing reports related to health and safety or governmental regulations.

13. An integrated logistics system according to claim 12, wherein the purchasing module blocks an award of a shipment to a carrier according to information maintained in the regulatory module.

14. An integrated logistics system according to claim 12, wherein the regulatory module accesses the Material Safety Data Sheet (MSDS) information maintained in the Enterprise Resource Planning software of a shipper.

15. An integrated logistics system according to claim 1, wherein the shipment management module includes a data management tool managing the viewing and/or updates of the data in the first relational database in a secure change environment.

16. An integrated logistics system according to claim 1, wherein the first relational database in the shipment management module receives information from the shipper and carrier for each shipment, the contract administration module, and the scheduling module.

17. An integrated logistics system according to claim 1, wherein the shipment management module receives or computes position data to audit and/or calculate current information on detention and to validate charges for detention.

18. An integrated logistics system according to claim 1, wherein the shipment management module computes inventory data to calculate the position and amount of inventory in the shipments tracked by the shipment management module.

19. An integrated logistics system according to claim 1, wherein the shipment management module provides information on the location and status of equipment of a given shipper or carrier.

20. An integrated logistics system according to claim 1, wherein the shipment management module forwards an electronic authorization for payments to the financial module according to the shipment records in the first relational database.

21. An integrated logistics system according to claim 1, wherein the contract administration module permits minor changes to a contract awarded by the purchasing module by coordinating change requests and change response messages between the shipper and the carrier.

22. An integrated logistics system according to claim 1, wherein the scheduling module receives electronic data from a shipper for a shipment and forwards said data to the corresponding carrier via a distributed communications network and XML.

23. An integrated logistics system according to claim 22, wherein the scheduling module matches and synchronizes the timing of notification, booking or offer of the shipment with the carrier and automatically notifies the shipper that the shipment has been confirmed.

24. An integrated logistics system according to claim 1, wherein said purchasing modul maintains carrier information relating to each one of said plurality of carriers;

receives a proposal for the shipment of goods supplied from a shipper, said proposal including shipping information relating to the shipment of the goods and transaction information relating to the contract terms for the shipment;

evaluates the proposal to select a carrier from among said plurality of carriers; and creates an electronic abstract of a contract between the shipper and the selected carrier for the shipment of goods identified in the proposal.

25. An integrated logistics system recited in claim 24, further comprising:

communicating with the selected carrier to receive a response regarding the electronic abstract of the contract;

creating an electronic abstract of the response received from the selected carrier; and confirming selection of the selected carrier with the shipper using the electronic abstract of the response received from the selected carrier.

26. An integrated logistics system as recited in claim 24, wherein the carrier information includes qualification information for each one of the plurality of carriers.

27. An integrated logistics system as recited in claim 26, wherein the qualification information indicates the ability of the plurality of carriers to ship different categories of goods.

28. An integrated logistics system as recited in claim 27, wherein the different categories of goods include chemicals.

29. An integrated logistics system as recited in claim 24, wherein the evaluation further comprises:

sending an electronic abstract of the proposal to the potential carriers;

evaluating responses to the electronic abstract of the proposal received from the potential carriers, said responses including shipping information supplied by the carrier relating to the shipment of the goods or transaction information relating to the contract terms for the shipment;

selecting one of the potential carriers for the shipment on the basis of the responses to the electronic abstract of the proposal and the carrier information.

30. An integrated logistics system as recited in claim 1, said scheduling module comprising:

retrieving routing information for a plurality of different transport modes;

retrieving carrier information relating to each one of a plurality of different carriers for each one of said plurality of different transport modes;

determining a routing for the shipment of goods from said origin to said destination based on said retrieved routing information; and scheduling, via a computer network, the shipment of goods from said origin to said destination based on said carrier information.

31. An integrated logistics system according to claim 30, wherein the scheduled shipment of goods from said origin to said destination is scheduled to use at least two different transport modes.

32. An integrated logistics system according to claim 30, wherein the logistics system is a third party logistics system.

33. An integrated logistics system according to claim 30, wherein one of said plurality of different transport modes comprises truck transport.

34. An integrated logistics system according to claim 32, wherein said carrier information includes information relating to bulk truck carriers, truckload carriers, and less than truckload carriers.

35. An integrated logistics system according to claim 32, wherein said shipment is scheduled using information unique to truck transport.

36. An integrated logistics system according to claim 30, wherein one of said plurality of different transport modes comprises rail transport.

37. An integrated logistics system according to claim 35, wherein said shipment is scheduled using information which is unique to rail transport.

38. An integrated logistics system according to claim 30, wherein one of said plurality of different transport modes comprises containership transport.

39. An integrated logistics system according to claim 37, wherein said shipment is scheduled using information which is unique to containership transport.

40. An integrated logistics system according to claim 30, wherein one of said plurality of different transport modes comprises bulk tanker transport.

41. An integrated logistics system according to claim 39, wherein said shipment is scheduled using information which is unique to bulk tanker transport.

42. An integrated logistics system according to claim 30, wherein one of said plurality of different transport modes comprises air freight.

43. An integrated logistics system according to claim 42, wherein said shipment is scheduled using information which is unique to air freight.

* * * * *

UNITED STATES PATENT AND TRADEMARK OFFICE
CERTIFICATE OF CORRECTION

PATENT NO. : 6,915,268 B2
DATED : July 5, 2005
INVENTOR(S) : Riggs et al.

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 298 days. --.

Signed and Sealed this

Twenty-seventh Day of September, 2005

JON W. DUDAS
*Director of the United States Patent and Trademark Office*